United States Patent [19]

Matsui

[11] 4,090,903
[45] May 23, 1978

[54] APPARATUS AND METHOD FOR MANUFACTURING A CONTAINER FROM A THERMOPLASTIC RESIN FOAM SHEET

[75] Inventor: Takashi Matsui, Nara, Japan

[73] Assignee: Sekisui Kaseihin Kogyo Kabushiki, Nara, Japan

[21] Appl. No.: 678,985

[22] Filed: Apr. 21, 1976

[30] Foreign Application Priority Data

Apr. 26, 1975 Japan .................................. 50-51182

[51] Int. Cl.² ............................................... B31F 3/00
[52] U.S. Cl. ................................. 156/211; 93/58 ST; 156/217; 156/227; 156/257; 156/443; 156/510; 156/580
[58] Field of Search ............... 156/211, 499, 204, 226, 156/227, 196, 257, 269, 510, 217, 212, 580, 583, 581, 443; 93/58 ST, 51 HW; 220/9 F; 229/30

[56] References Cited

U.S. PATENT DOCUMENTS

| 3,360,420 | 12/1967 | Daul et al. ....................... 156/211 X |
| 3,876,494 | 4/1975 | Ogawa et al. .................... 156/211 X |
| 3,980,005 | 11/1974 | Buonaiuto ..................... 93/58 ST X |

FOREIGN PATENT DOCUMENTS

| 1,218,139 | 1/1961 | Germany. |
| 49-44943 | 11/1974 | Japan. |
| 50-2181 | 1/1975 | Japan. |
| 48-6874 | 3/1973 | Japan. |
| 48-53876 | 7/1973 | Japan. |

Primary Examiner—David A. Simmons
Attorney, Agent, or Firm—Armstrong, Nikaido, Marmelstein & Kubovcik

[57] ABSTRACT

An apparatus and a method for manufacturing a container from a thermoplastic resin foam sheet comprising:

(A) A free, perpendicularly movable heating device composed of at least three pressing blades arranged so as to form a polygonal shape by connecting their ends to one another respectively, each of said pressing blades having a V-shaped cross section at its edge, the cross-sectional angle of said edge being smaller by 10-25° than the angle of bend of a flat thermoplastic resin foam sheet, a plurality of cutting blades, each of which has the edge level higher by 0.5-1.5 mm than the edge level of the linear pressing blade, being disposed at a position deviated by 1-2 mm diagonally outward from the corner of the polygon defined by the arrangement of the pressing blades, with the opening angle of said cutting blades not exceeding 90°.

11 Claims, 13 Drawing Figures

APPARATUS AND METHOD FOR MANUFACTURING A CONTAINER FROM A THERMOPLASTIC RESIN FOAM SHEET

BACKGROUND OF THE INVENTION

Hitherto there have been proposed several methods of manufacturing a container from an expanded thermoplastic resin sheet. For example, Japanese Patent Publication No. 44943/1974 discloses a metod of fabricating a container from a plain thermoplastic resin sheet which has been previously cut into an extended shape with side walls surrounding a bottom area, with this being accomplished by pressing a heated V-edged parallel cross shaped device to form the bend lines, followed by bending the sheet upward along these bend lines to form the side walls and building up a container. The said process has a drawback in requiring extra manipulative steps because of the use of prefabricated material made by cutting and removing the marginal pieces and forming the bend lines into an unfolded sheet.

Japanese Patent Publication No. 2181/1975 discloses a method of manufacturing a container from a plain thermoplastic resin sheet cut into a fixed size, by pressing a heating and cutting means provided with parallel cross shaped V-edged pressing blades and a marginal cutting blades thereto to provide the bend lines and the side wall joining portions, and forming the side walls by bending upward along the bend lines. The said method, not provided with a cutout piece ejecting mechanism, is susceptable to production of defective products because, if the marginal portions which should be removed remain in a fused state even in small portions, said marginal portion may be inserted simultaneously with the expanded sheet into the concave portion of the female mold at the time of the insertion. In both of the above methods, the cross section of the edge of the linear pressing blade has an angle of about 90 degrees.

Japanese Patent Publication Nos. 6874/1973 and 53876/1973 also disclose box making machines having special blades, but neither of them is equipped with a cutout piece ejecting mechanism nor pays any special consideration to the edge angle of the V-shaped hot blades.

West German, Laid-open Pat. No. 1,218,139 discloses a method of manufacturing an illumination case from a thermoplastic synthetic resin sheet by providing the cutting lines over all surfaces thereon, applying heat thereto along the bend lines, followed by bending, wherein the V-edged V-groove is cut on the bend line, then the linear electric heating element is guided along the V-groove in parallel with the groove in a condition such as to prevent contact after which the sheet is bent along the V-groove. It must be noted, however, that this method uses a non-foaming synthetic resin sheet, such as an acryl resin, as a material, wherein, for example, in bending the sheet to an angle of 90°, the groove must be formed by scraping off such as by milling, etc. to a cross section of 90° in advance. The present invention offers a method of manufacturing a container which is an improvement over prior procedures and does not, for example, necessitate previous scraping steps to form the grooves.

Also, while there are, among the known containers, only boxes having a square bottom and upright side walls, the present inventor has found it possible, as a consequence of various studies, to readily produce containers having side walls at an inclination of 45° or more from the bottom surface.

DETAILED DESCRIPTION OF THE INVENTION

Figure 1:
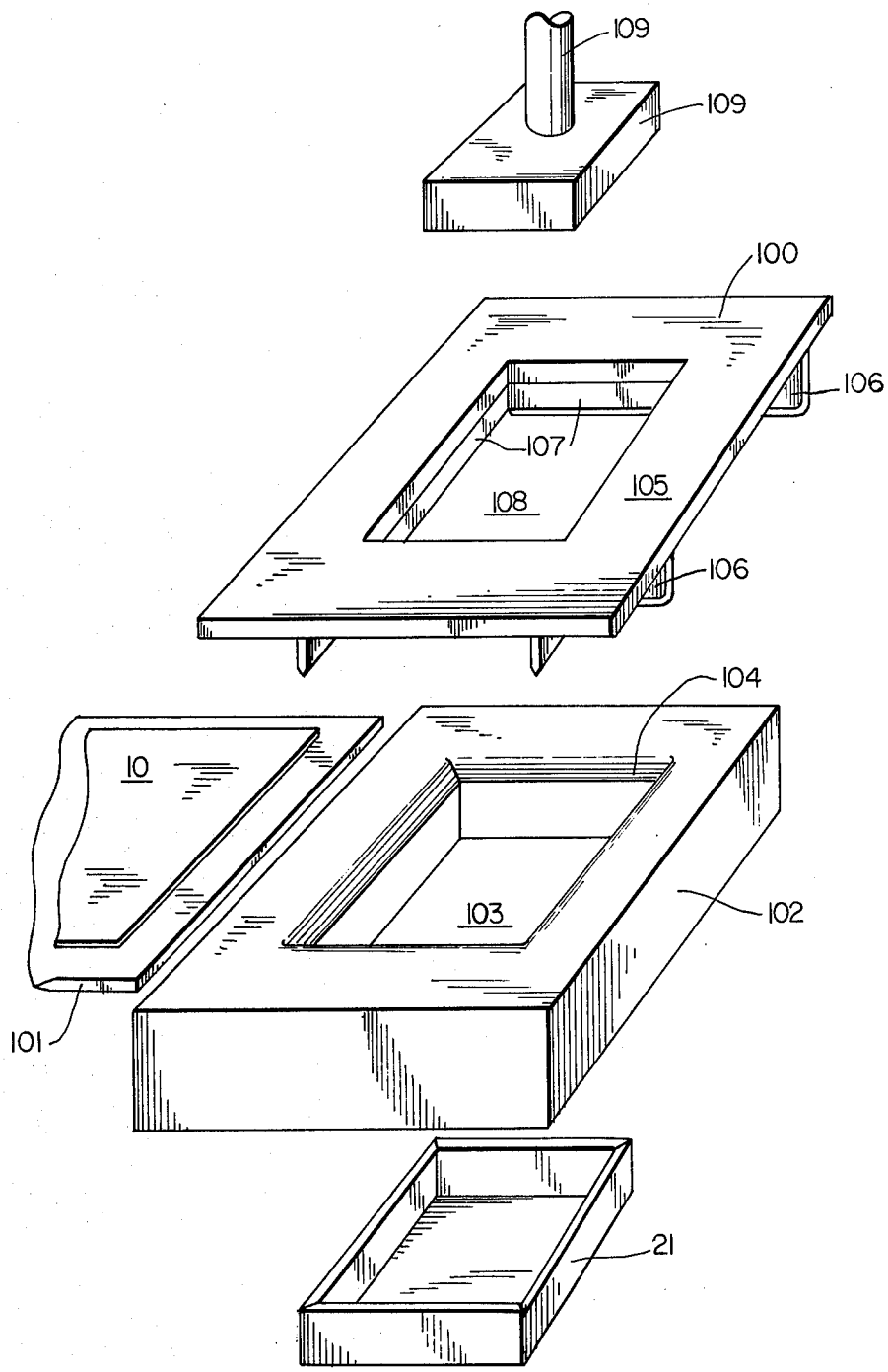
FIG. 1 is a schematic representation of the elements of the apparatus for manufacturing the container of the present invention.

The present invention relates to an apparatus for manufacturing a container from an expanded thermoplastic resin sheet and a method for manufacture thereof. More particularly, the present invention consists of the following:

An apparatus for manufacturing a container from a flat thermoplastic resin foam sheet by providing bend lines thereon and by welding the bending lines and the joining portions, comprising:

(A) A free, perpendicularly movable heating device composed of at least three pressing blades so as to form a polygonal shape by connecting their ends, one to another, each of said pressing blades having a V-shaped cross section at its edge, the cross-sectional angle of said edge being smaller by 10–25° than the angle of bend of a flat thermoplastic resin foam sheet, and a plurality of cutting blades each of which has an edge level higher by 0.5–1.5 mm than the edge level of the linear pressing blade, being disposed at a position deviated by 1–2 mm diagonally outward from the corner of the polygon defined by the arrangement of the pressing blades, with the opening angle of said cutting blades not exceeding 90°, (B) A hollow mold which has a surface to accommodate an unfolded thermoplastic resin foam sheet formed by means of the linear pressing blades and the cutting blade provided on the heating device and which has a surface adjusted to join the bend lines and the joining sides of the unfolded sheet in fabrication, and, (C) A cutout piece ejecting device having a scraper which moves forward and backward in differentiated routes for ejecting the cutout pieces which have been cut out by said cutting blades on the surface of the above hollow mold, characterized by lowering the heating device to form the thermoplastic resin foam sheet, guiding the surface of the hollow mold into an unfolded sheet, ejecting the resulting cutout pieces by means of the cutout piece ejecting device, pressing the unfolded sheet in the hollow mold so as to weld the bend lines and the joining portions thereof to obtain a container, and a method for manufacture of a container thereby.

Accordingly, it is an object of the present invention to provide an apparatus for effectively manufacturing a container of thermoplastic resin foam sheet having a good appearance, and particularly having superior and excellent fusion bend lines and the joining portions, and a method of manufacturing such a container.

An object of the present invention is to obtain sufficient welding by compression of the thermoplastic resin foam sheet during bending by forming the edge of the pressing blade into a cross-sectional angle of 10°–25°, preferably 15°–20°, smaller than the bending angle of the sheet material set for assembly.

Another object of the invention is to obtain a container free from interstices in the joined parts by welding the joining portions under compression by providing the cutting blades at a position deviated by 1–2 mm diagonally outward from the pressing blades.

A further object of the invention is to ensure the cutting of the marginal portions of the thermoplastic resin foam sheet by disposing the cutting blades on a level 0.5–1.5 mm higher than the pressing blades, and to prevent the thermoplastic resin foam sheet from being cut off at the formation of the V-shaped grooves by the pressing blades.

A further object of the invention is to obtain the desired polygonal container and an inclined-sided container having the lateral sides rising at an optional angle by replacing the heating device and the hollow mold.

A still further object of the invention is to prevent production of defective containers by automatically eliminating the production of cutout pieces by means of the cutout piece ejecting device.

Other objects and advantages will become apparent from the following detailed description taken in connection with the accompanying drawings in which:

FIG. 1 is a schematic representation of the structural elements for manufacturing the container of the present invention, in which the element 10 is the foam sheet of thermoplastic resin to be used in the present invention. As such a foam sheet, there can be used those foam sheets of polystyrene, polyethylene, polyvinylchloride, or copolymers thereof. It is desirable that these foam resin sheets to be used have a thickness of from 2 to 15 mm, preferably from 3 to 8 mm. The foam sheet 10 is removed from the foam sheet supplying device, passed through the plate 101, and placed on the hollow mold 102. The hollow mold is provided with an opening 103 extending therethrough. After placing the foam sheet 10, a heating device 100, which consists of the hot blade fitting plate 105 on the lower surface of which is fitted the cutting blade 106 and the pressing blade 107, each of which is heated to the temperature above the softening point of the foregoing foam sheet 10, is pressed onto the foam sheet 10 to produce an unfolded sheet having the side walls and the bottom plate connected en bloc. After formation of the unfolded sheet, the pressing device 109 is inserted through the opening 108 provided in the central part of the heating device 100 by the motion of a cylinder or the like which has a rod 110, and further extended vertically downward to insert the expanded sheet into the opening 103 of the mold 102. By this insertion, the lateral sides of the unfolded sheet are caused to rise and the lateral ends of the erected sides are abuttingly joined in the opening 103. The area 104 is an inclined guide to ensure smooth insertion of the material. By further vertical downward motion of the pressing device 109 a fabricated container 21 is obtained through the opening 103.

Figure 2A:
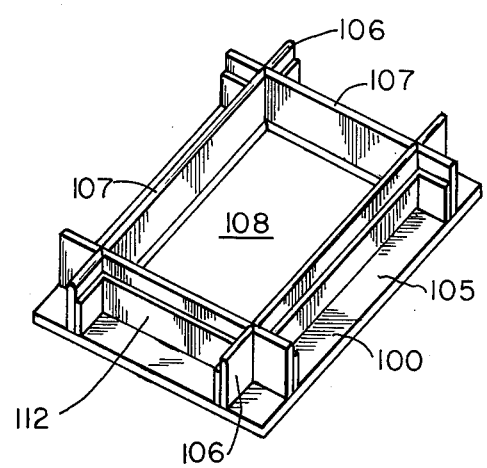
FIG. 2(a) is a perspective view illustrating the inverted state of the heating device for obtaining a quadruple container having the side walls disposed at right angles to the bottom plate.
Figure 2B:
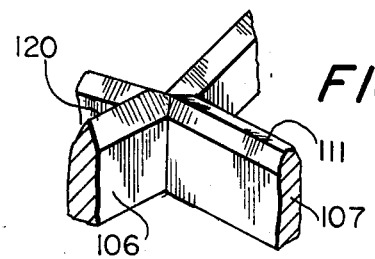
FIG. 2(b) is an enlarged perspective view of the corner part of the heating device shown in FIG. 2(a)
Figure 2C:
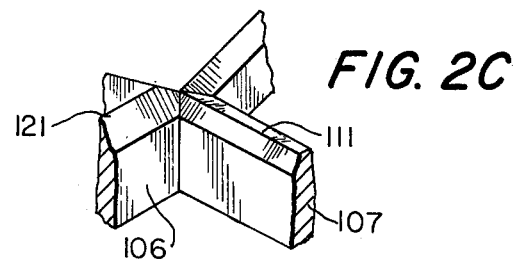
FIG. 2(c) is a perspective view illustrating a modification of the cutting blade shown in FIG. 2(b)
Figure 3A:
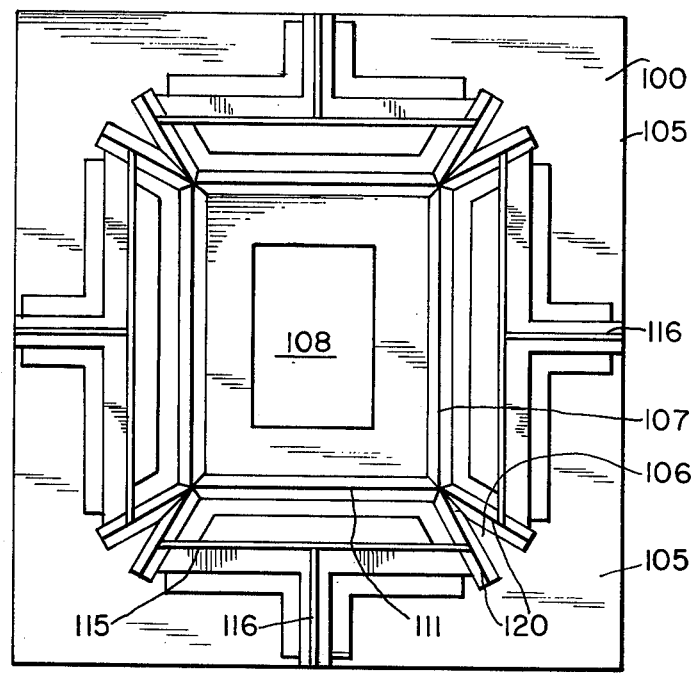
FIG. 3(a) is the bottom plan view ofa modification of the heating device shown in FIG. 2, illustrating the heating device for obtaining an inclined container having the side walls rising at an angle of 60° from the bottom plate.
Figure 3B:
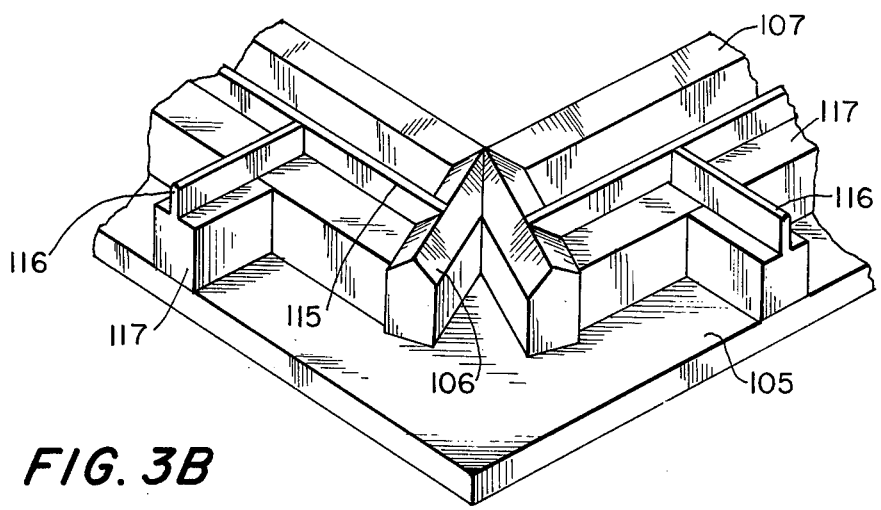
FIG. 3(b) is an enlarged perspective view of the corner part of the heating device shown in FIG. 3(a)

FIG. 2(a) is an inverted view of the heating device 100 for obtaining a square container having the side walls perpendicular to the bottom plate, FIG. 3(a) is a modification of FIG. 2, being a plan view of the heating device 100 for obtaining a container with inclined sides having a rising angle of 60° from the plane of the bottom plate, FIG. 2(b) is an enlarged perspective view of the corner part of the heating device 100 of FIG. 2(a), FIG. 2(c) is a modification of the cutting blade 106 of the heating device 100 of FIG. 2(b), and, FIG. 3(b) is an enlarged view taken from the right oblique direction.

In the drawing, 100 is a heating device, and 105 is a hot blade fitting plate. On the plate 105 there are fixed a plurality of heating and pressing blades 107 assembled into the shape of parallel crosses. The edge 111 of the pressing blade 107 is constructed in a V-shape as shown in FIG. 2(b) and FIG. 2(c). The edge 111 has its cross-sectional angle smaller by 10° to 25°, preferably by 15° to 20°, than the rising angle of the side walls from the plane of the unfolded sheet of the container to be fabricated. For example, to obtain a container with its side wall rising from the plane of the bottom plate at 90°, the pressing blade has the cross section of its edge at an angle of 65°–80°, preferably 70°–75°.

In the present invention, the reason why the cross-sectional angle of the edge of the pressing blade is made smaller by 10°–25° than the rising angle of the side wall of the container to be fabricated is based on the following:

The thermoplastic resin foam sheet 10 to be used as a material for the present invention is less resistive to heat than a non-foamed thermoplastic resin sheet or a corrugated board made of non-foamed thermoplastic resin. Accordingly, in forming a bend groove on a sheet with the heated pressing blade 107, where the cross-sectional angle of the edge of the pressing blade is the same as the rising angle of the side wall of the container to be fabricated, the area of the sheet with which the pressing blade 107 comes into contact is made molten by the effect of the heat of the pressing blade so as to cause the angle of the V-groove to be larger than the above rising angle of the side wall, with the result that, when the side walls are erected from the unfolded sheet, the joining portions are formed by bending the interstices at the bending grooves and are prevented from fusing to one another. In other words, when the thermoplastic resin foam sheet 10 to be used in the present invention is pressed with the heated pressing blade 107, the sheet is molten at an extra angle of 10°-25° beyond the cross-sectional angle of the edge of the pressing blade 107. Based upon this, the pressing blade to be used in the present invention is a type having an edge with a cross-sectional angle smaller by 10°-25° than the rising angle of the side wall of the container to be fabricated.

Where the edge cross-sectional angle of the pressing blade 107 is excessively smaller than the rising angle of the side wall of the container to be fabricated, the side wall can be erected to the desired angle only with great difficulty. If the side wall is forcibly erected, the bent portion may be broken or may cause squeezing out of the sheet such as to cause degradation in the quality of product.

With the bend lines provided on the thermoplastic resin foam sheet 10 by the use of the pressing blade 107 of the invention, which has an edge cross-sectional angle smaller by 10°-25° than the rising angle of the side wall at the bend line, the product is adequately made neat in appearance, since the bevels on the bending groove are pressed against each other to weld steadily without causing any squeezing out. When the pressing blade is constructed with five linear blades, six linear blades, and eight linear blades, the container is formed into pentagonal, hexagonal, and octagonal shapes, respectively.

On the external portion of the four corners formed by the pressing blades 107 there are fitted onto the plate 105, cutting blades 106, respectively, together with the pressing blades 107. Each edge of the cutting blade 106 is disposed at a level higher than each edge of the pressing blade 107 by 0.3-1.5 mm, preferably by 0.5-1.2 mm, or more preferably, by 0.7-1.0mm, as shown in FIG. 2(b), FIG. 2(c), and FIG. 3(b). Also, the cutting blade 106 is disposed at a position deviated by 1-2 mm, preferably 1-1.5 mm, diagonally outward from the corner defined by the pressing blades.

The reason why the edge of the cutting blade 106 is disposed on a higher level than the edge of the pressing blade 107 is because it is necessary, at the time of cutting the marginal area of the thermoplastic foam sheet 10 by the pressure of the cutting blade 106, to keep it connected with the remaining strip of 0.3-1.5 mm without being fully cut and separated by the pressing blade 107. As shown in FIG. 1, in pressing the thermoplastic resin foam sheet 10 with the heating device 100 on the mold 102, when the cutting blade 106 comes into tight contact with the surface of the mold 102, no further pressure is given. At this time, since the height of the pressing blade 107 is lower than that of the cutting blade 106 by 0.3-1.5 mm, the bending groove is formed on the foam sheet with the remaining thickness of 0.3-1.5 mm. Also, the reason why the cutting blade 106 is provided at a position deviated by 1-2 mm diagonally outward from the corner defined by the pressing blades 107 is to provide full welding of the cut surfaces formed by the cutting blades by only slightly pressing them. The cutting blade may have an edge of V-shaped cross-section 120 as shown in FIG. 2(b) or a semi-V-shaped cross-section 121 as shown in FIG. 2(c).

The pressing blade 107 and the cutting blade 106 are constructed of a metal such as iron, stainless steel and the like. In order to heat the respective pressing blade 107 and cutting blades 106 a band heater 112 is fitted to the lateral sides of the pressing blades 107 and the cutting blades 106. By directing an electric current to the band heater, the pressing blade 107 and the cutting blade 106 are heated. The temperature for heating the pressing blade 107 and the cutting blade 105 may vary by kind, thickness, foaming degree, and the like, of the thermoplastic resin foam sheet 10, but is suitably in the range of from 230° to 300° C, preferably from 250° to 280° C. If a temperature above 300° C is applied, the portions of the foam sheet 10 contacted under the pressure of pressing blade 107 and cutting blade 106 are melted excessively under the heat of these blades, and the pores constituting the foam sheet in the vicinity thereof are broken to increase the resinous portion, whereby the overheated portions are deteriorated to make the joints of the fabricated container fragile or to make the welding performance poor. On the other hand, at a temperature below 230° C, a longer time is required for providing the bend line and the cut surface, and the molten and softened portion of the sheet is insufficient for welding the required bending portions.

Numeral 108 depicts an opening, through which the pressing device 109 shown in FIG. 1 is moved up and down in a vertical direction.

The heating device 100 in FIG. 2(a) illustrates the means applicable to the situation for producing a square container having the rising angle of the side wall relative to the plane at 90 degrees from a thermoplastic resin foam sheet 10 cut into a fixed size beforehand. However, as shown in FIG. 3(a) and FIG. 3(b), by arranging the cutting blades 115 and 116 on the outer periphery of the pressing blade 107 it is possible to produce at a single time and at a fixed size the expanded sheets of the desired container from a thermoplastic resin foam sheet 10 of a larger size than desired. In FIG. 3(a) and FIG. 3(b), 115 is a cutting blade which defines the size of the side wall, and 116 is a cutting blade for cutting the marginal portions produced by the motion of the cutting blade 106 and the cutting blade 115 into the required number of pieces. It is preferable that the cutting blades 115 and 116 be composed of the same material as that of the cutting blade 106. Since the cutting blades 115 and 116 define the upper level of the side wall of the container to be fabricated, the shape of the edges of these blades should desirably be flat, as shown in FIG. 3(a) and FIG. 3(b). The thickness of the blade edge is 0.5-2mm, and preferably 0.7-1.2 mm. Suitably, the cutting blades 115 and 116 should be heated like the cutting blade 106, thereby providing a beautiful appearance of the cutting finish. The angle of disposition between a pair of cutting blades 106 as illustrated in FIG. 3(a) and FIG. 3(b) is 30°, being smaller than the 90° angle shown in FIG. 2(a). At this angle, the container, when fabricated, will have the inclined side wall at an angle of 60°. In this case, the pressing blade 107, to be used, should have a cross-sectional angle of 50° on the edge thereof. Numeral 117 represents a stand or base to accommodate the cutting blade 115 and 116. The cutting blades 115 and 116 may be either welded to or fitted into the fitting plate 117.

Figure 9:
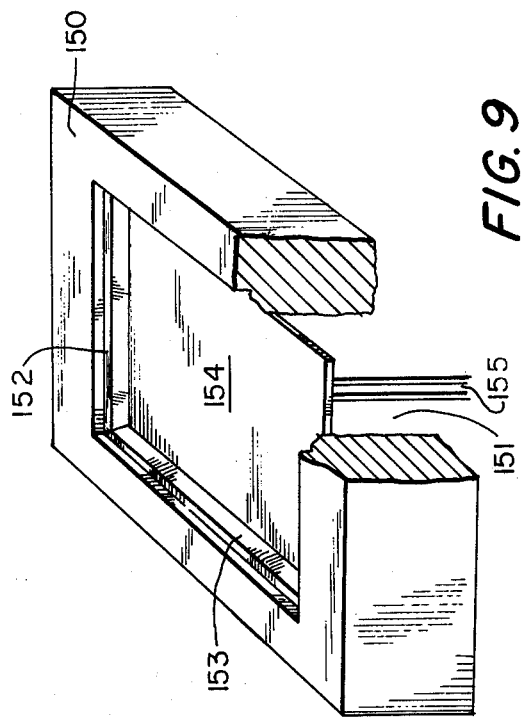
FIG. 9 is a partially broken perspective view of the hollow mold and the push-up plank suitable for manufacturing the side-inclined container.

In order to obtain a container having the inclined side walls by the use of the heating device illustrated in FIG. 3(a) and FIG. 3(b), a mold 100 of FIG. 1 may be used. However, in view of the workability problems, preferably, the mold shown in FIG. 9 should be used. In FIG. 9, 150 is a hollow mold, on the inside of which a hollow space 151 is provided. In the inner wall of the mold 150 there is provided a receiving sleeve 152 which is perpendicularly sunk to a depth equal to the thickness of the thermoplastic resin foam sheet to be used, and, downward from the inner edges of said receiving sleeve 152, a bevel 153 is located having substantially the same inclination as the angle of inclination of the side wall of the container to be fabricated. Numeral 154 represents a push-up plank, which is integrally connected with the end of the piston rod of the cylinder to be driven by air, hydraulic pressure, etc. so as to move up and down in a vertical direction. When the heating device 100 is let down to come into contact with the thermoplastic resin foam sheet, the push-up plank 154 rises to come face-to-face with the heating device 100, with said sheet lying between. When the pressing device 100, moves downward, the push-up plank 154 also moves downward proportionally. By the face-to-face positioning of the heating device 100 with the push-up plank 154 mediated by said sheet, the forming of the bend line and the cutting of the foam sheet can be easily performed.

Figure 4A:
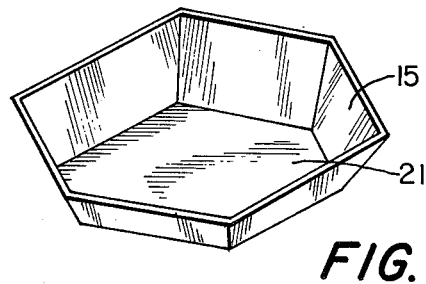
FIG. 4(a) is a perspective view of the container to be manufactured by using the heating device of FIG. 4(b)
Figure 4B:
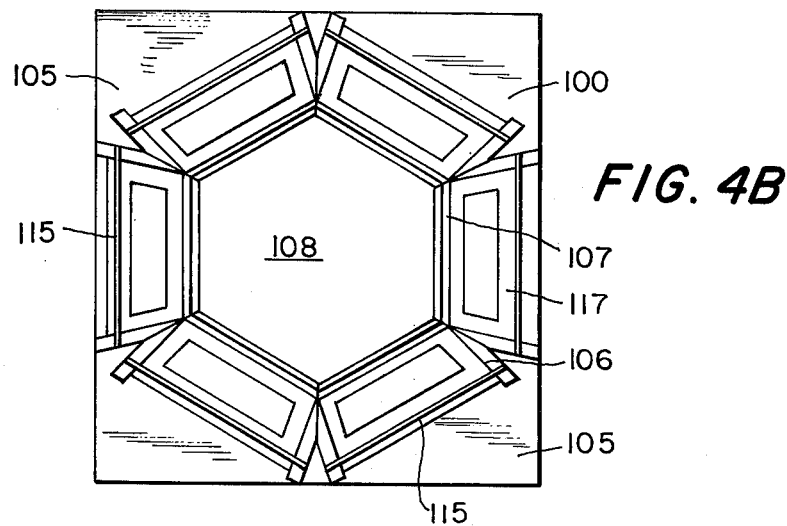
FIG. 4(b) is a plan view of the heating device for obtaining a side-inclined container having the side walls rising at an angle of 60° from the bottom plate plane and an equilateral hexagonal bottom plate.

In order to obtain a container 21 which has a hexagonal shape with a 60° rise in the side wall 15 as shown in FIG. 4(a), a heating device 100 shown in FIG. 4(b) is used, wherein there are provided pressing blades 107 constructed of six linear blades formed into a hexagonal shape, and the cutting blades 106 having the semi-V-cross-sectional shape of the edge of blade disposed in V-shape arrangement at the opening angle of 30°, slightly outward from the corner defined by the pressing blades. In this case, the cross-sectional angle of the edge of the pressing blade 107 is desirably 20°. Also, the preferred cross-sectional angle of the edge of the cutting blade 106 is 10°. The cutting blades 115 for determining the height of the side wall of the container to be fabricated are provided in parallel outward from the pressing blades 107. The pressing blades 107 and the cutting blades 106 and 115 are integrally set on the hot blade fitting plate 105 via the blade fitting base 117. The inside of the hexagonal frame constituted by the pressing blades 107 on the plate 105 is comprised of opening 108 to permit up and down vertical, frictional movement of the pressing device 109 of FIG. 1. The heating device 100 of such a construction is used by reversing the structure, as shown in FIG. 1.

In the above case, it is quite acceptable that the cutting blade 106 may be flat at this edge as in the case of the cutting blade 115.

Figure 5:
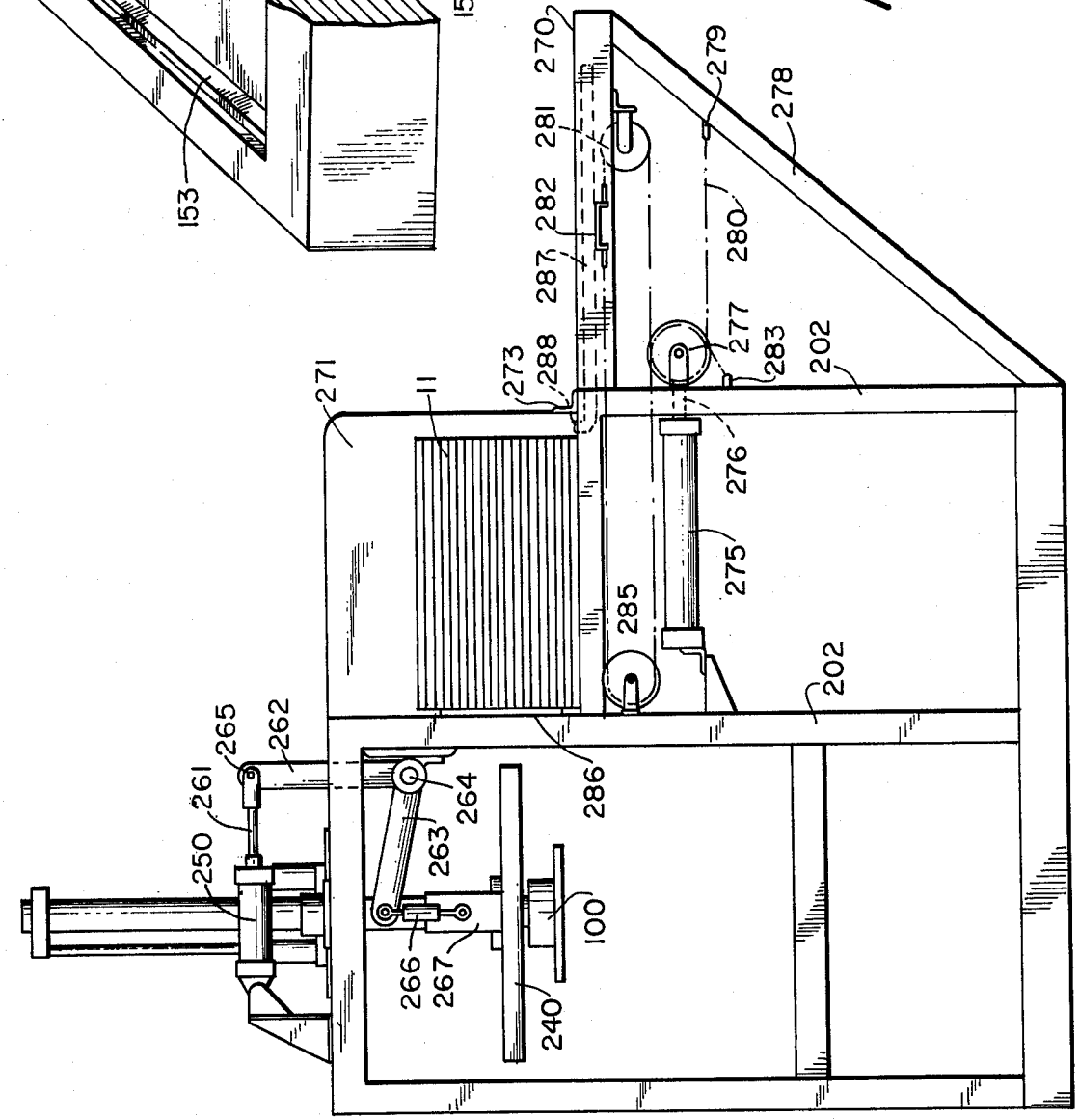
FIG. 5 is an illustration of the essential parts to show a device for feeding thermoplastic foam sheet material onto the hollow mold and a device to move in a vertical direction.
Figure 6:
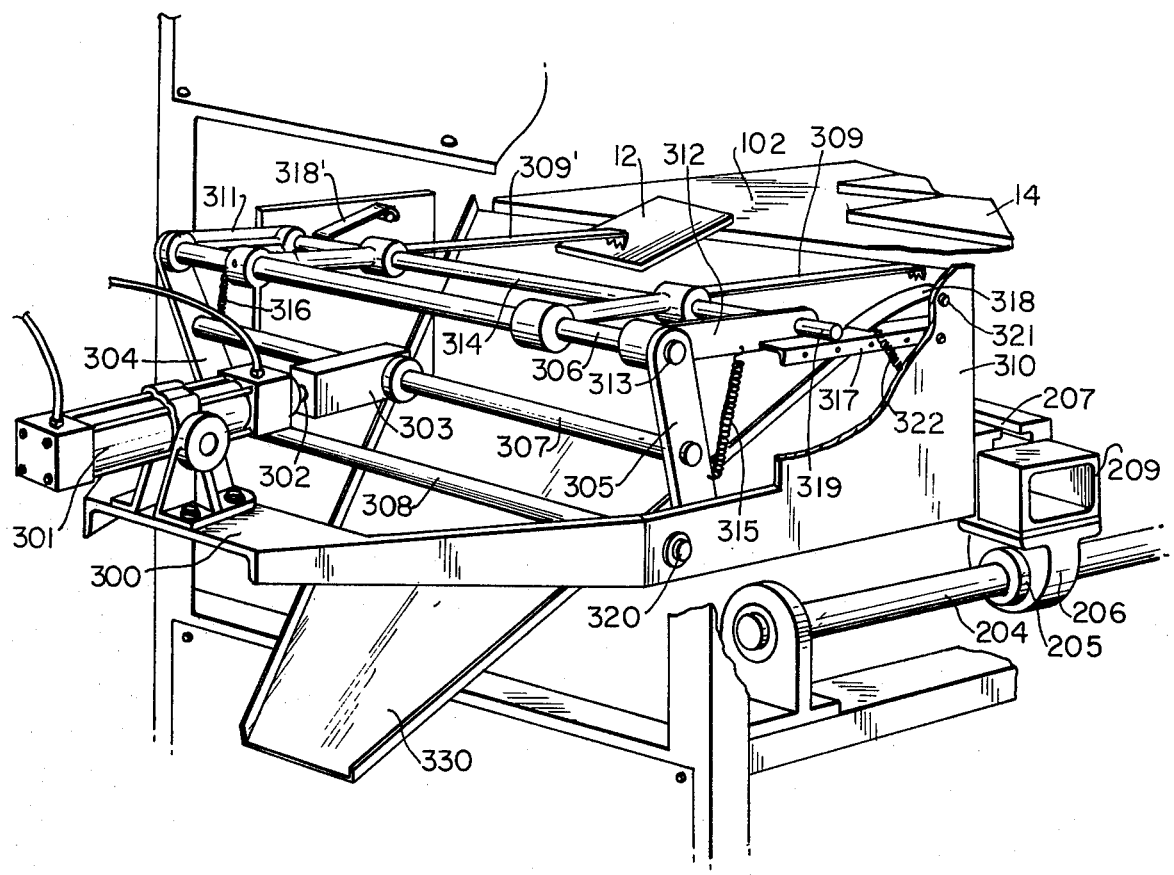
FIG. 6 is a perspective view of the essential parts of the cutout piece ejecting device.
Figure 7:
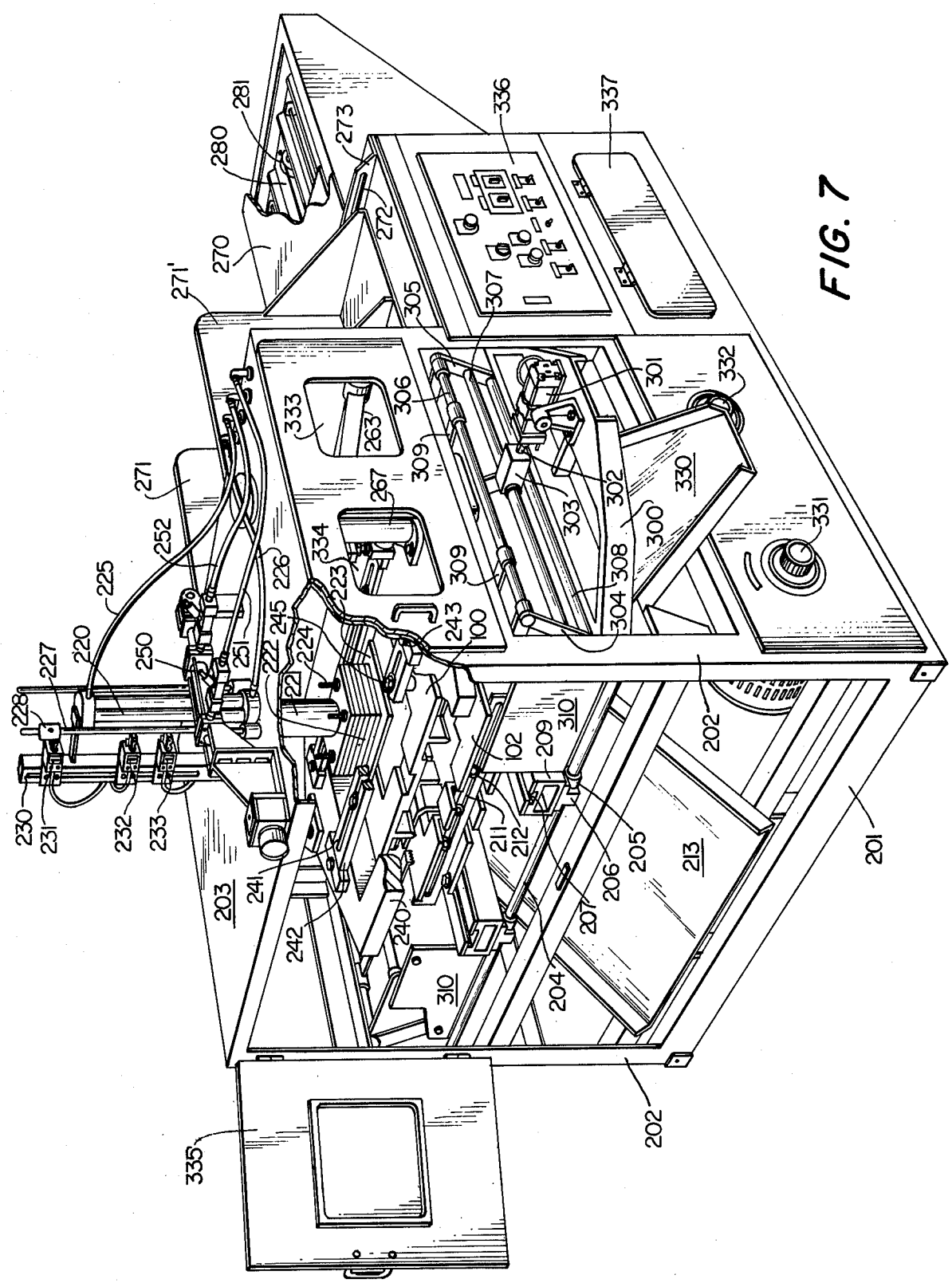
FIG. 7 is a partially broken perspective figure to illustrate the entire apparatus.

FIG. 5 is an illustration of the device to supply the thermoplastic resin foam sheet 10 onto the mold 102 and the device to move up and down vertically, the pressing device 109 and FIG. 6 is a perspective view of the cutout piece ejecting device. FIG. 7 is a partially broken view to illustrate the whole apparatus. Based on these drawings explanations are given hereinafter.

On the frame 201 there are provided the stays 202, upon which a top plate 203 is laid to constitute the main body. Between the stays 202 of the main body a sliding shaft receptacle 205 is constructed. Onto a sliding shaft 204, a pair of mold fitting members 206 are anchored to permit freely slidable movement via the slide shaft receptacle 205. On these two mold fitting members 206 are fixed the mold fitting bases 209 on which the recessed slots 207 are engraved. Riding on these two mold fitting bases 209, the mold 102 is fixed with screws placed in the slot 207. The mold 102 used in FIG. 7 is not the fixed size mold as in FIG. 1 but is divided into plural pieces which are secured to the fixing means 211 with the bolts 212. By this means, conformity to the varied sizes of containers to be produced is attainable.

Numeral 213 represents a chute for the delivery of the product.

On the ceiling plate 203 there is provided a cylinder 220. To the extremity of the piston rod 221 of the cylinder 220, a pressing plate 223 is fixed with the bolt 224 via the base 222. The pressing plate 223 is replaceable according to the size of the container to be fabricated. The pressing device 109 is formed of a base 222, pressing plate 223, and bolt 225. The cylinder 220 is driven by air from air pipes 225 and 226. The piston rod 221 is provided integrally with the position setting bar 227, with which the three limit switches 231, 232 and 233 are fitted. The limit switches 231, 232, and 233 are the switches to define the upper limit, intermediate, and lower limit, respectively. It is so arranged that, at each time the positions of the limit switches 231, 232 and 233 are changed, the position of the slidable movement of the piston rod 221 is shifted.

Numeral 240 represents a frame for fitting the heating device. On the frame 240, the fitting frame 242 for fitting the heating device, bored with the slot 241, is set by means of the bolt 243. The heating and pressing device 100 shown in FIG. 1 is set by means of the bolt 245 mediated by the slot 241.

Numeral 250 represents a cylinder for slidably driving the heating and pressing device 100 up and down, being provided horizontally on the top plate 203. The cylinder 250 is actuated by the air or hydraulic pressure directed through the air pipes 251, 252. The related working mechanism is illustrated in FIG. 5. In FIG. 5, the cylinder 250 has a piston rod 261 which protrudes and recedes according to the motion of the cylinder 250. To the foremost end of the piston rod 261 there is accommodated, in a freely rotatable manner, the L-shaped arm, which is constructed of two arms 262 and 263, the crossing point of which is welded to make its angle invariable. At the crossing point of the arms 262 and 263 there is a key 264 secured to the stay 202, on the fulcrum of which the arm swings up and down with the motion of the arm 262. The crossing point of the piston rod 261 and the arm 262 is connected by a freely rotatable key 265. On the other end of the arm 263 there is freely rotatably fitted a turnbuckle 266, at the lower end of which is fitted the frame 240 for fitting the heating device mediated by the metal 267.

When the piston rod 261 protrudes by the action of the cylinder 250, the arm 262 is shifted toward the protrusion of the rod 261 at the fulcrum of the key 265. With the shifting of the arm 262, the arm 263, which is integral with the arm 262, shifts upward at the fulcrum of the key 264. According to the upward shifting of the arm 263, the frame base 240 for fitting the heating device, to be moved in association via the arm 263, the turnbuckle 266, and the metal 267, shifts upward. To the contrary, when the piston rod 261 moves backward, the arm 262 shifts in the direction of the backward movement of the piston rod 261, by which the arm 263 shifts downward. With the downward shifting of the arm 263 the heating device fitting frame base 240 shifts downward. At the downward shifting of the frame base 240 for fitting the heating device, the heating and pressing device 100 fitted to the lower surface of the frame base 240 exerts pressure to impress the bend lines and the joining portions on the thermoplastic resin foam sheet.

By adjusting the turnbuckle 266, the distance between the frame base 240 and the hollow mold 102 can be regulated.

Numeral 270 represents a table to supply the thermoplastic resin foam sheet 10. On the forward position of the table 270 there are a pair of the side plates 271, 271' for adjusting the width of the foam sheet 10. The side plates 271, 271' are engaged in a slidably free movable manner with the fixing members 273, each of which is bored with a slot 272, and which are secured to the body. These side plates 271, 271' play a role of preventing the zigzag movement of the foam sheet 10 at the time of its supply onto the hollow mold 102. In FIG. 5, the portion 11 shows many thermoplastic resin foam sheets piled up in layers. A cylinder 275 is fixed to the stay 202. At the extremity of the piston rod 276 of the cylinder 275 is provided a freely rotatable pulley 277. On this pulley 277 there are two grooves, on one of which is applied a wire belt 280 supported by the wire belt supporting means 279 which is fixed to the stay 278. The wirebelt 280 is further applied to the pulley 281 which is freely rotatably provided on the reverse surface of the table 270 and is anchored to one side of the wire fitting flange 282. On the other groove is applied a wire belt 284 supported by a supporting means 283 which is fixed to the stay 202. The wire belt 284 is applied to the pulley 285 which is freely rotatably provided on the stay 202 and is anchored to the other side of the wire fitting flange 282 is mounted a push plate 287, at the foremost end of which there is provided, through the slot bored on the table toward the hollow mold 102, a protruding part 288 which has a height less than the thickness of a sheet of said foam sheets. Numeral 286 represents a stopper to prevent two or more of said foam sheets 10 from being advanced for pressing simultaneously. The space between the stopper 286 and the plate 270 is so provided as to be less than the thickness of two of said foam sheet but is larger than the thickness of a single sheet.

The wire-fitting flange 282 and the push 287 are fixed together by screwing with bolts and the like. By shifting the screw-stopped position of the push plate 287 the thrusting distance of the pushing part 287 toward the hollow mold 102 can be changed. When the piston rod 276 protrudes by the motion of the cylinder 275, the wire 284 is pulled toward the supporting point 283 and the wire 280 toward the wire fitting flange 282, respectively, as in the drawing. As a result, the wire fitting flange 282 held between the wires 280 and 284 moves to the left in the drawing. With the left protrusion of the wire-fitting flange 282, the push plate 287 integrated with the wire fitting flange 282 by screw-stopping also advances to the left. When the push plate 287 advances, the projection 288 provided at the foremost end of the push plate 287 pushes the lowest sheet (not stopped with the stopper 286) of the thermoplastic resin foam sheets 11 piled up in many layers to feed onto the hollow mold 102. After the feeding of the foam sheet, the recission of the piston rod causes the pulling of wire 284 toward the flange 292 and the wire 280 toward the supporting point 279, with the result that the push plate 287 moves backward. By repetition of the above motions, said foam sheets 10 can be continuously supplied onto the hollow mold 102.

Referring to FIGS. 6 and 7, the member 300 denotes a carriage which is laterally provided between opposed upright posts 202 and 202. On the carriage 300 is mounted a cylinder 301 for removing a corner cutout piece. A piston rod 302 of the cylinder 201 has a rotary metal member 303 at its end. The rotary metal member 303 is secured to a middle horizontal shaft 307 which is slidably mounted between a set of opposed slidable frames 304 and 305 together with an upper horizontal shaft 306 and a lower horizontal shaft 308. The lower ends of the slidable frames 304 and 305 together with an upper horizontal shaft 306 and a lower horizontal shaft 308. The lower ends of the slidable frames 304 and 305 are swingably supported by the keys 320. Mounted swingably about the upper slidable shaft 306 are a pair of cutout piece ejecting paws 309 and 309'. The member 310 is a bracket member adapted to receive a cutout piece ejecting sliding guide member. In FIG. 6, at the upper ends of the frames 304 and 305 are secured swingably a pair of movable frames 311 and 312, respectively, by means of set pins 313 and 313. The ends of the frames 304 and 305 are provided respectively with a hole through which a slidable shaft 314 is loosely mounted in parallel with the middle shaft 306 between the frames 304 and 305. A spring member 315 is provided between the slidable frames 304 and 311 to form a resilient connection between the two members, and another spring member 316 is provided between the slidable frames 305 and 312 for the same purpose. This will prevent the slidable frames 311 and 312 from swinging upward. The cutout piece ejecting paws 309 and 309' are mounted at their ends about the shaft 306 through the intermediary of the shaft 314. The bracket 310 is provided with a guide bar 317 to which is connected a guide plate 318 and 318' having a given grade. On the graded surface of this guide plate 318 and 318', the projected ends 319 of the shaft 314 disposed in the frames 311 and 312 will slide. The ends of the guide plates 318 and 318' are made and cut shorter than the entire length of full thrust of the piston rod 302.

By the action of the cylinder 301, the piston rod 302 is caused to thrust forward, actuating the forward movement of the metal member 303. This forward movement of the metal member, in turn, causes the forward movement of the shaft 306 through the swinging motion of the frames 304 and 305 which are keyed at their lower ends pivotally or swingably onto the bracket 310. This also causes the shaft 314 to move forward, causing its projected ends 319 and 319' to move forward and slide upwardly along the graded or curved surfaces of the guide plates 318 and 318' while causing the paws or hooks 309 and 309' to move up. When the projected ends 319 and 319' of the shaft 314 pass the upper ends of the guide plates 318 and 318', said ends 319 and 319' come into contact with the cutout piece 12 formed by the heating device 100. The guide plates 318 and 318' are respectively secured at their upper edge onto the bracket 310 by a set screw 321. Their lower ends are held in contact with the guide bar 317. At the return of the paws 309 and 309' to the original position, the paws 309 and 309' slide with the cutout piece held between them and drop the cutout piece 12 into the chute 330.

FIG. 6 illustrates the condition immediately before dropping the cutout piece 12 into the shooter 330. When the piston rod 302 is pulled back after its forward thrust, the projected ends 319 and 319' are caused to move back on the guide bar 317 to resume the initial position.

The member 322 indicates a spring member having its one end connected to the lower ends of the guide plates 318 and 318' and its other ends secured onto the bracket 310 so that, when the projected ends 319 and 319' move forward, they are prevented from passing underneath the guide plates 318 and 318'.

The portion 330 denotes a chute for removing the cutout piece. Numeral 331 denotes a transformer for heating the cutting blade, and 332 a transformer for heating the pressing blade, respectively. Numeral 333 and 334 represent the windows covered or glazed with glass, etc. through which the inside of the apparatus may be scanned. Numeral 335 is a work door and 336 is a control panel on which a time and other elements are mounted to actuate the cylinders 220, 250, 301, and 275. Numeral 337 is a removable door or cover for a box housing the electric wires etc.

Substantial explanation will be given as to the method of manufacturing an inclined-side container by mounting the heating device 100 shown in FIG. 3(a) and the hollow mold 150 of FIG. 9 in the apparatus of FIG. 7.

Figure 8:
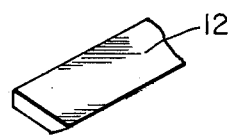
FIG. 8 is a perspective view of the unfolded plate of the thermoplastic resin foam sheet to be manufactured by using the heating device shown in FIG. 3(a)
Figure 8:
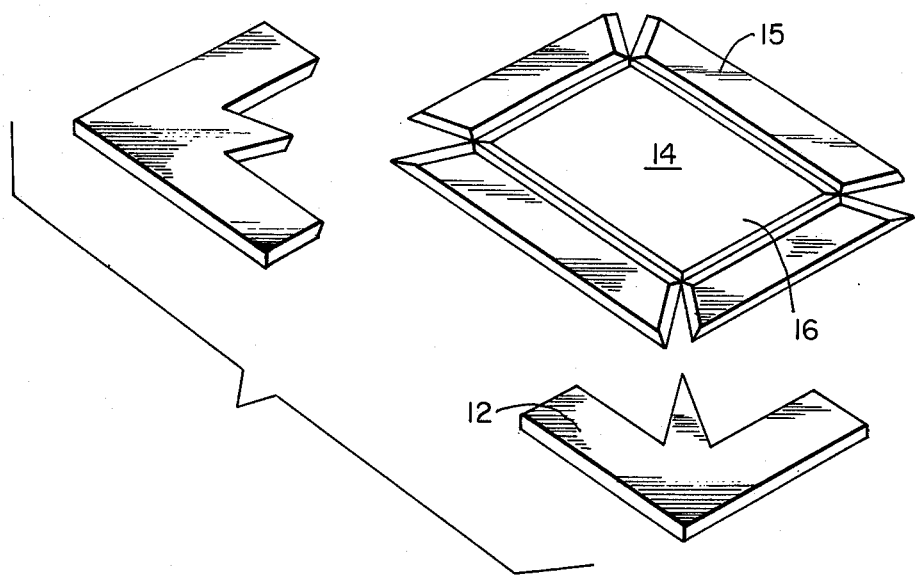

As shown in FIG. 5, several layers of thermoplastic resin foam sheet 11 are placed on the feeding plate. One of the sheets 10 is fed into the hollow mold 150 by the projection 288 through the forward motion of the cylinder 275 of the sheet-feeding device. After feeding the sheet 10, the projection 288 is moved back by means of the backward movement of the cylinder 275. Simultaneously with the feeding in of the foam sheet 10 through the action of the cylinder 220, the pressor plate 223 is lowered from the position of a limit switch 231 to the position indicated by 223. At the same time, the push up plate 154 is raised up by the upward motion of the rod 155, thereby securing or fixing a flat sheet 10 of thermoplastic resin. Subsequently, when the heating device 100 is lowered by the action of the cylinder 250 through the arm 263, the cutting blades 106, 115, and 116 are actuated to cut off the fractional pieces 12 from the flat sheet of thermoplastic resin, as shown in FIG. 8.

Simultaneously, by the pressure of the linear pressing blade 107, the bending line 13 is given onto the bottom part of the sheet to form an expanded sheet 14. Upon formation, the heating device 100 is raised up to the initial position by the backward action of the cylinder 250. Numeral 15 is a side wall and 16 is a bottom plate. With the heating device 100 retained in its position, the unfolded sheet 14 is held between the pressor plate 223 and the push-up plank 154 disposed at the lower end of the hollow mold 102, and the unfolded sheet 14 is lowered from the location of the limit switch 232 to the location indicated at 233 and placed on the receiving flange 152 provided inside the hollow mold 102 on the lower level than its surface. Then, the heating device 100 is lifted up and the cutout piece 12 is removed from the hollow mold 102 by means of the remover-paw 309 of the cutout piece ejecting device. The reasons why the abovementioned receiving flange 152 is formed between the upper surface of the hollow mold 102 and the upper end of the inclined surface 153 of said mold 102 are to facilitate the removal of the cutout piece 12 from the unfolded sheet 14 and to facilitate cutting of any fractional part by aligning the inner peripheral level of the receiving flange 152 and the ridge-line of the cutting blades 115. By lowering the cutting blades perpendicularly on the receiving flange 152, the fractional part 12 can be precisely cut off. Another reason is that, since the side walls 15 of the inclined-side container 21 to be provided by this invention have a certain degree of inclination, in making the unfolded sheet 14 into the assembled container 21, the contacting edges of its side walls are liable to catch the cutout pieces 12 in-between them or the cutting blade may be caught by the cutout piece 12, if the bending up of the side walls is effected on the upper surface of the hollow mold 150 without the cutout pieces being dropped onto the receiving flange 152. This gives rise to an apprehension of producing an incomplete or faulty product. This may be prevented by bending up the side walls only after the linear pressing blade 107 is raised and the cutout piece 12 has been fully removed. However, if the cutout piece 12 is completely removed under this method, one extra process has to be added, requiring more time for manufacture. Since the contacting surface of the unfolded sheet 14 is in a softened state and susceptible to surrounding temperature even for a short period of time, the drop in temperature results in insufficient or defective heat-bonding effect on the contacting side.

By bending up the side walls and heat-bonding the contacting surface after dropping the unfolded sheet 14 once on the receiving flange 152, a box-making process is commenced without the fear of touching the heated blade or catching the cutout pieces at the four corners of the unfolded sheet in between the side walls, and without the necessity of lifting the linear pressing blade 107 and completing the cutout piece removing operation, with the result that the time required for one complete cycle of the box-making operation can be shortened.

It is desirable that the depth of the receiving flange 152 should not be less than the thickness of the thermoplastic resin sheet 10, or more preferably, one-fourth to the half of the height of the inclined-side container 21 to be produced.

When the pressor plate 223 and the push-up plank 154 are further brought down while interposing the unfolded sheet 14 therebetween, the bend line 13 of the unfolded sheet 14 is bent up along the inner inclined surface 152 of the hollow mold 150, and the wedge-like contacting edges cut out by the cutting blade 106 are fused and unified in the opening 151 of the hollow mold 150, and an inclined-side container 21 is formed.

The container 21 is taken out of the lower end of the hollow mold 150 through the chute 213 when the pressor plate 223 is further brought downward. After the container is taken out, the pressor plate 223 is lifted up to the previous position by the rearward movement of the cylinder 220, whereupon the push-up plank 154 is raised up. Again, by the forward movement of the cylinder 275, a thermoplastic resin foam sheet is fed in process continuously for manufacturing the inclined-side container.

Taking the inclined-side container 21 out of the opening 151 may not be achieved through the lower part of the hollow mold 150 but by raising the push-up plank 154 to the upper surface of the hollow mold 150 by means of a push-out pin which slides transversely on the upper part of the hollow mold 150. In this case, the push-up plank 154 serves as a presser or push plate in the fabrication of the expanded sheet 14 and also as a means of pushing up the container 21 from the inside of the hollow mold 150.

When a polystyrene resin foaming sheet is used as a flat sheet 10 of thermoplastic resin material 10, it is desirable to use the hot blades, i.e., the cutting blades 106, 115, 116 and the linear cutting blades 107 after they have been heated to a temperature of from 230° to 280° C. In this case, if the heat cutting and pressing treatments (with hot blades) are done for 2-4 seconds and the cooling process is permitted in the hollow mold 102 for 2 to 4 seconds, the inclined-side container 21 with its joint edges perfectly bonded together can be manufactured from thermoplastic resin flat sheet 10 continuously at a cycle of about 10–20 seconds.

The present invention, as described above, provides a method for efficiently manufacturing out of thermoplastic resin flat sheet a beautiful inclined-side container 21 with its joint edges perfectly bonded one with another. In case the inclined-side container thus manufactured has a side wall 6 which is inclined at an angle of between 45° and 75° to the plane of the bottom part, those containers can be piled one upon another. The piling up of these containers offers a great advantage in respect of transportation and warehousing and its economical merit is great. The boxes obtained by the method of this invention can be used for a wide variety of applications such as, for example, packing case or box for various kinds of foodstuffs, shrink-pack receptacles and other containers.

The following are the examples in which the present invention for manufacturing a container is embodied; but not to be limited to these embodiments.

EXAMPLE ONE

A container was fabricated by using the heating device 100 illustrated in FIG. 2. The pressing blades 107 of the heating device 100 are arranged in the shape of parallel crosses, in which the edge of the pressing blade 107 has a V-shaped cross section having an angle of 75°. The cutting blade 106 is provided 1.0 mm higher at its edge level than the pressing blades 107 constituting the parallel cross shape structure and 1.5 mm outwardly from the crossing point thereof. The cutting blades 106 and the pressing blades 107 are heated by means of a band heater 112 to the temperature of 300° C.

A polystyrene foam sheet of 6 mm thickness, foamed and unfolded to about 8 times the original sheet, is first fed to and placed on the upper surface of the hollow mold 102 by means of a feeding device illustrated in FIG. 5, and then, the heating device 100 is lowered from above. When the heating device 100 presses down said polystyrene foam sheet from above, the marginal portion of said sheet is cut off by the cutting blades 106, and at the same time the linear bend line is provided by the pressing blades 107, thereby forming an expanded sheet. Then, the pressing device 109 is lowered through the hole 108 to press upon the unfolded sheet 14 while the heating device 100 is raised. The heating device 100 is brought in contact with the sheet for four seconds. Subsequently, the pressing device 109 is lowered further to engage the opening 103 of the hollow mold 102. By inserting the pressing device 109 into the hole 102 of the hollow mold 102, the bottom part of the expanded sheet is pushed down, whereupon the side wall or edge is bent up, as dictated by the peripheral wall of the opening 103, along the bend line. The abutting side edges are joined together into a box. Since the bend line and the abutting side edges have already been heated and softened by both the pressing blades 107 and the cutting blades 106, they are easily bent and fused together. After leaving the box for about 3 seconds in the hole 103 of the hollow mold 102 for tight bonding, the pressing device 100 is further lowered downward, thereby causing the finished container 21 to drop down from the opening 103 and then to be taken out of the apparatus through the chute. The fabricated container 21 showed a fine bonding effect on the abutting edges and had a beautiful finish with respect to uniformity in thickness and edge bonding.

EXAMPLE TWO

As shown in FIG. 3, a pair of the opposed linear pressing blades 107 with the edge angled at 40° are spaced 190 mm apart, and the other pair of linear pressing blades 107 are spaced 250 mm apart. The cutter blade 115 has the cutter blade 106 oppositely provided at an angle of 40° thereto and carries a narrow 1 mm wide flat longitudinal edge at its top. The cutting blades 115 are disposed in parallel with the linear pressing blades 107 at 40 mm apart therefrom.

The heating device 100 used in this example is structured such that the edge level of the cutting blades 106 and 115 are made 1 mm higher than the edge level of the linear pressing blades 107, and the hollow mold 150 used in conjunction with said heating device 100 has a dimension corresponding to that of the heating device 100 and is provided with inclined side walls at an angle of 60°. By using these members, the inclined-side container 21 was made.

Polystyrene foam sheet of 5.5 mm thickness, which has been foamed and unfolded to 9 times the original sheet, is used as a thermoplastic resin sheet. This polystyrene foam sheet 10 is fed to and put on the upper surface of the hollow mold 150 illustrated in FIG. 9 by means of the projection 28 of the feeding device. The sheet is then held between the push-up plank 154 and the pressor plate 223, whereupon the heating device 100 consisting of the cutting blade 106 and the pressing blade 107, which have been heated to the temperature of 250° C by a heating device, is lowered from above, thereby cutting off and pressing down said sheet to produce an open, unfolded sheet 14 on which a V-shaped groove, 4 mm in depth and with an angle of 40° in cross section, is formed by the linear pressing blade 107.

Immediately after the formation of the unfolded sheet, the cutout pieces 12 which have been cut off are held by the paws 309 and 309' of the cutout piece ejecting device and are removed out of the apparatus through the chute 330.

Then, the open, unfolded sheet 14 is lowered further down while being held between the pressor plate 223 and the push-up plank 154 and placed on the receiving flange, whereupon the heating device 100 is raised up. Subsequently, the unfolded sheet 14 is brought further down, whereupon the side edges of the unfolded sheet are bent up along the bend line 13 thereon, as dictated by the inclined side surface 153 of the hollow mold 150. The edges to be joined at 17 are formed by the cutting blades 106 are brought into contact with one another. Since the unfolded sheet 14 has been heated and is in a half-softened state, the abutting edges are completely fused together. After cooling the fresh container 21 in the mold 150, the pressor plate 223 is raised and the push-up plank 154 is raised up to the upper surface of the mold 150, whereupon the container 21 is pushed out by the push-out pin. Said container 21 has a bottom side 16 of rectangular shape measuring 190 mm × 250 mm and side walls 15 of 40 mm width, standing up from the bottom 16 at an angle of inclination of 60°. The abutting edges 17 are perfectly bonded and the container is strongly built, having no loose opening or clearance between the bottom side 16 and the bent up line 13 of the side walls 15.

The time actually required for making the inclined-side container 21 from polystyrene foam sheet 10 is 10 seconds in total for each complete cycle, comprising 1 second for feeding the polystyrene foam sheet 10 onto the upper surface of the mold 150, 1 second for clamping the sheet between the push-up plank 154 and the pressor plate 223, 1 second for the heating device 100 to let down, 2 seconds for the hot blade cutting process (with heated cutting blade and linear pressing blade), 1 second for cutout piece ejection and pushing the fresh container into the hollow mold 150, 3 seconds for cooling it in the mold 150, 1 second for pushing the fresh container out of the mold 150 and 1 second for taking out the product (inclined-side container). Since the pushing out of the finished container and the feeding in of the next polystyrene foam sheet 10 can be effected simultaneously, this embodiment can permit production of an inclined-side container 21 out of the polystyrene foam sheet 10 continuously at a production cycle of 10 seconds.

EXAMPLE THREE

An inclined-side container is manufactured by using the heating device 100 illustrated in FIG. 4(b) and a hollow mold (not shown) having a shape and an inclined surface suitable for forming an open, unfolded sheet 14 with a specific bottom to be made by said mold.

The linear pressing blades 107 arranged in a right sexangular shape have their upper end of the cutting blade 106 perpendicular at one side and inclined at an angle of 20° at the other side, while the cutting blade 115 has a narrow 1 mm wide flat longitudinal edge at its top. The heating device 100 used in this example is structured such that the upper level of the cutting blades 106 and 115 are made 1 mm higher than the upper level of the linear pressing blades 107. The angle at which the cutting blades 106 are contacted with one another is 30°. The length of diagonal line of the sexangular-shaped linear pressing blades 107 is 190 mm, and the distance between the linear pressing blades 107 and the cutting blades 115 paralleled therebetween is 40 mm.

The hollow mold has a central opening 108 of right sexangular shape corresponding to the shape of the bottom side of a container to be formed by the above linear pressing blades 107, and the inclined-side walls with an angle of inclination of 60°. The push-up plank and the pressor plate 223 used have a surface of sexangular shape.

When processing polystyrene foam sheet 10 to 5.5 mm thickness, foamed and unfolded to 9 times the original sheet, into a container in the same manner as described in Example 1 with the abovementioned apparatus, a beautiful and strongly built container 21 having a right sexangular bottom side 16 with 190 mm and diagonal line and side walls 15 with 40 mm width and inclined at an angle of 60° to the bottom side 16, is obtained.

What is claimed is:

1. An apparatus for manufacturing a container from a flat thermoplastic resin foam sheet by providing bend lines thereon and by fusing the bending lines and the abutting edges, comprising:
   (a) a free, perpendicularly movable heating device composed of at least three pressing blades arranged to form a polygonal shape by connecting their ends together, each of said pressing blades having a V-shaped cross section at its edge, the cross-sectional angle of said edge being smaller by 10° – 25° than the angle of the bend in the flat thermoplastic resin foam sheet, and cutting blades, each having an edge level higher by 0.5 – 1.5 mm than the edge level of a linear pressing blade, the point of intersection of said cutting blades being disposed at a position deviated by 1 – 2 mm diagonally outward from the corner of the polygon defined by the pressing blades, and an opening angle of said cutting blades which does not exceed 90°;
   (b) a hollow mold which has an inner surface to accommodate an unfolded foam sheet and formed by a combination of the linear pressing blade and a cutting blade provided on the heating device, and, wherein, in the hollow mold the bend lines and the joining sides of the unfolded sheet are connected to form a container, and,
   (c) a cutout piece ejecting device having a scraper which moves forward and backward in differentiated routes for ejecting the cutout pieces which have been cut out by said cutting blades on the surface of the hollow mold, characterized by a heating device to form the thermoplastic resin foam sheet which is guided to the surface of the hollow mold and into an unfolded sheet.

2. The device according to claim 1, including the hollow mold with an opening thereon, characterized in that the container whose side-walls have been fuse-bonded by the pressure of a pressor plate is extended to the lower part of said opening by the further downward movement of the pressor plate and is taken out from the product delivery chute.

3. The device according to claim 1, including the hollow mold, the opening in which has an inclined inner surface at an angle not exceeding 90° from the plane of the device, characterized in that the fuse-bonded container is pushed up from the lower part of the opening by means of a push-up plank and is taken out from the product delivery chute.

4. The device according to claim 1, further characterized by forming an unfolded sheet receiving flange on a surface stepped down from the surface of the hollow mold.

5. A method for manufacturing a container of thermoplastic resin foam material comprising:
   (a) pressing a flat thermoplastic resin foam sheet by means of a heating device composed of at least three linear pressing blades so as to form a polygonal shape by connecting their respective ends together, each of said pressing blades having a V-shaped cross section at its edge, and the cutting blades of each having an edge level higher by 0.5–1.5 mm than the edge level of the linear pressing blades, being disposed at a position deviated by 1–2 mm outwardly from the corner of the polygonal defined by the pressing blades, and an opening angle of said cutting blades being not exceeding 90°;
   (b) producing an unfolded sheet formed with bend lines by pressing with approximately 0.5–1.5 mm thickness of said foam sheet retained by means of at least three linear V-shaped polygonal grooves with their respective ends connected together, said foam sheet including the areas of the bottom plate and the side walls bordered by said bend lines, groove bevels having an angle 10°–25° smaller than the angle of the side wall portion in relation to the plane of the device, and formed with the joining edges and the marginal corners of said foam sheet being cut out with said cutting blades;
   (c) separating said heating device from said unfolded sheet;

(d) ejecting the cutout pieces cut out with said cutting blade; and, (e) assembling said unfolded sheet in a body by erecting the side walls at an angle 10°–25° more than the aforesaid angle of the bend line and fuse-bonding the bend lines and edges to be joined together at a stroke while the bend lines and the edges of said unfolded sheet to be joined are at a temperature above their softening point.

6. A method for manufacturing a container according to claim 5, which further comprises obtaining an unfolded sheet designed to form a container having the side walls perpendicularly upright from the bottom plane, fuse-bonding the edges of said sheet to be joined on the peripheral wall of an opening in the hollow mold by lowering a pressor plate, dropping the fabricated container to the lower part of the hollow mold by further lowering the pressor plate.

7. A method for manufacturing a thermoplastic container according to claim 5, which further comprises forming an unfolded sheet, said sheet having side wall portions so designed as to be erected with an inclination at an angle not exceeding 90° from the plane of the bottom portion and the marginal areas cut out with cutting blades, inserting said sheet in the hollow mold which has circumferential walls complementary to the outside shape of the fabricated containers and which is provided with an unfolded sheet receiving flange on the surface at a location stepped down from the surface thereof, and fuse-bonding the joining portion of the side walls by the application of heat.

8. A method for manufacturing a container according to claim 5, which further comprises lifting up the container, the joined portion of which is fuse-bonded at the circumferential wall of the mold to the surface of the hollow mold and extending the device by means of the extending pin.

9. A method for manufacturing a container according to claim 5, wherein the thermoplastic resin sheet is a foamed sheet of resin selected from the group consisting of polystyrene, polyethylene, polyvinylchloride, and a copolymer containing polystyrene as a main component.

10. A method for manufacturing a container according to claim 9, wherein the thermoplastic resin foam sheet is composed of a material having a thickness of 2 – 15 mm.

11. A method for manufacturing a container according to claim 5, further comprising heating the linear pressing blades and the cutting blades to a temperature in the range of from 200° to 300° C.

* * * * *